United States Patent [19]

Storm

[11] 4,273,278
[45] Jun. 16, 1981

[54] ADJUSTABLE LUGGAGE RACK
[75] Inventor: Manfred Storm, Cheshire, Conn.
[73] Assignee: Oliver Industries, Inc., New Haven, Conn.
[21] Appl. No.: 36,678
[22] Filed: May 7, 1979
[51] Int. Cl.³ .............................................. B60R 9/04
[52] U.S. Cl. .................................. 224/321; 403/236; 248/225.3 R
[58] Field of Search ............... 224/321, 326; 403/191, 403/236, 233; 248/255.3, 226.4; 182/228

[56] References Cited
U.S. PATENT DOCUMENTS

| | | | |
|---|---|---|---|
| Re. 26,539 | 3/1969 | Bott | 224/326 |
| 3,519,180 | 7/1970 | Bott | 224/321 |
| 4,099,658 | 7/1978 | Bott | 224/326 |

Primary Examiner—Herbert F. Ross
Attorney, Agent, or Firm—McCormick, Paulding & Huber

[57] ABSTRACT

An automotive luggage rack has a pair of side rails extending parallel to one another and supported above the vehicle roof in stanchions at opposite ends of the side rails. One or more cross rails is provided between the side rails and cross rail end fittings have portions to encircle the side rails so that the cross rail can be moved longitudinally of the side rails. Clamping devices are provided in the end fittings for securing the cross rails in desired locations relative to the side rails. Each side rail is C-shaped with an elongated insert to close the open side of the C, and a flat underside to be engaged by the clamping device.

10 Claims, 4 Drawing Figures

U.S. Patent  Jun. 16, 1981  4,273,278
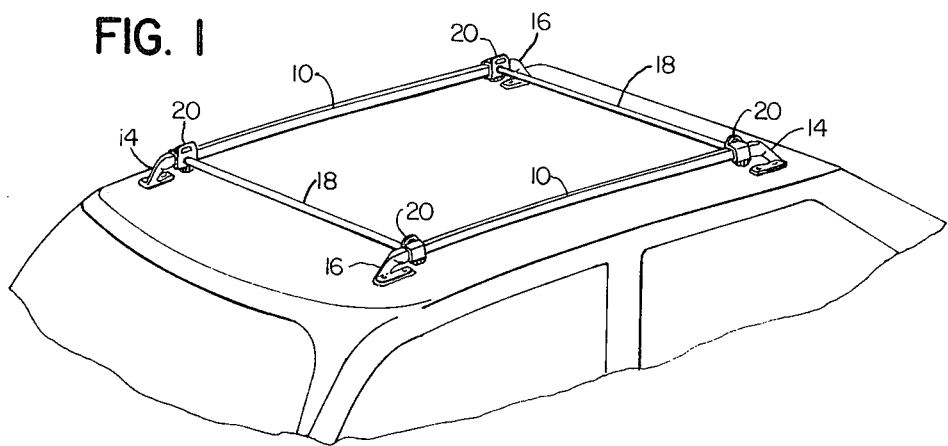
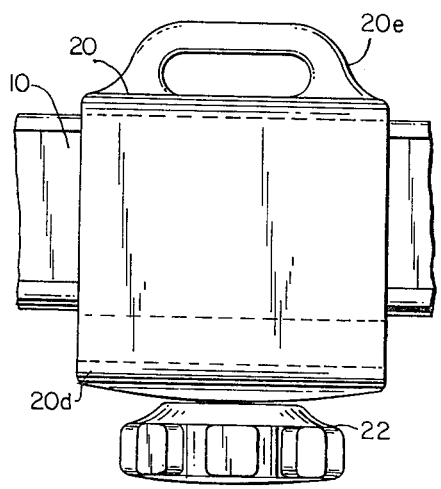
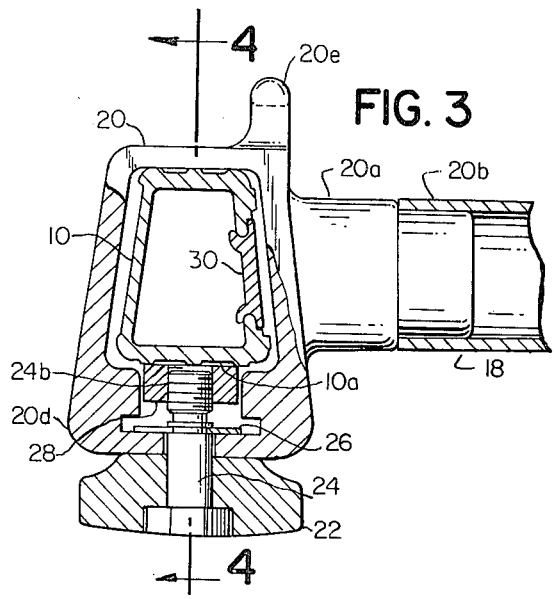
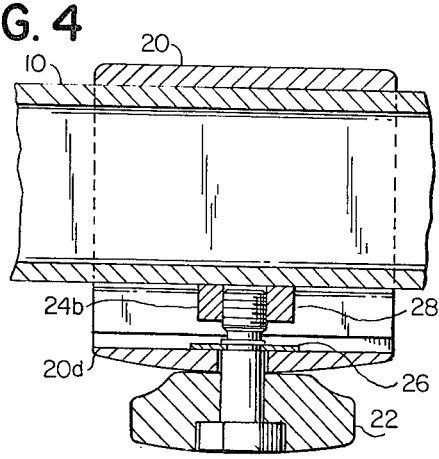

ADJUSTABLE LUGGAGE RACK

SUMMARY OF INVENTION

This invention relates generally to automotive luggage racks and deals more particularly with an adjustable luggage rack of the type having four stanchions supporting two side rails, which preferably extend longitudinally of the vehicle, above the vehicle roof. One or more cross bars is provided between the side rails, with end fittings to adjustably clamp the side rails to selected locations longitudinally of the side rails.

Automotive luggage racks of the type supported by four stanchions generally take either one of two forms. Some such racks utilize tubular side and cross rails with the rails being fixed relative to one another as shown for example in Helm Pat. No. 2,919,841 and Smith U.S. Pat. No. 3,120,914. Other so-called adjustable cross rail racks, typically include an extruded side rail of C-shaped cross section as shown in Bott U.S. Pat. No. 3,253,755 and also in Bott Pat. No. 3,519,180. The C-shaped cross section of the side rails permits sliding means to be located inside the channel or guideway defined by the C-shaped cross section so that end fittings provided on the cross rails (which may themselves be tubular) can clamp these cross rails to the inner side wall of the C-shaped channel. More specifically, the sliding means inside the channel abuts an interior surface of the channel defining side wall, and the cross rail end fitting abuts the exterior of the inner side rail wall so as to clamp the side rail between the end fitting and the sliding means located within the side rail channel.

The present invention seeks to combine the advantages of the earlier tubular type automotive luggage racks with those of the adjustable luggage racks, of the type requiring openings in the side wall of the side rail, in order to provide a very rugged luggage rack construction similar to the tubular types referred to above but with the adjustability feature achieved in the Bott patents as a result of utilizing a C-shaped side rail to define a guideway for receiving sliding means within the guideway or channel.

The foregoing results are achieved in a luggage rack of the present invention by providing a pair of spaced parallel side rails of closed tubular cross section above the vehicle roof and supported in spaced relationship to the vehicle roof by stanchions secured to the roof by suitable screws or the like. One or more cross rails extends laterally across the vehicle roof at substantially the same level as that of the side rails, that is spaced above the vehicle roof, with end fittings provided in the cross rail ends. More particularly projecting portions of these end fittings are received generally axially in the ends of the tubular cross rail. These end fittings also have opening defining portions for encircling the tubular side rails and these openings slidably receive the tubular side rails so that the end fittings and cross rail can be slid longitudinally of the side rails and positioned at the desired location relative to said side rails. Each cross rail end fitting includes a clamping device in the form of threaded posts rotatably received in the underside of the portion encircling the side rail, and a knob on the lower end of each threaded post can be manually rotated so as to rotate the post in an opening provided for this purpose in the cross rail end fitting. This cross rail end fitting portion has an opening for the threaded post, and a nut threadably received on the inner end of the post which nut can be moved toward and away from the underside of the tubular side rail itself. Each cross rail end fitting has such a clamping device associated with it and if one adjustable cross rail is utilized two such clamping devices are provided one at each of the opposite ends of the cross rail. A retaining ring is provided in an annular groove intermediate the head and the threaded post so as to avoid inadvertent disassembly of the clamping device from its associated cross rail end fitting. Finally, the side rails are preferably of C-shaped cross section with an insert to close the open side and a flat lower surface to abut or engage the upper face of the threaded nut associated with the post.

BRIEF DESCRIPTION OF THE DRAWING

FIG. 1 is a perspective view of a luggage rack embodying the present invention, being shown mounted to the roof of an automotive vehicle, the latter being shown fragmentarily to illustrate the environment of the present invention.

FIG. 2 is a side elevational view of the outside of one of the cross rail end fittings illustrated in FIG. 1 and showing a side rail fragmentarily.

FIG. 3 is a view, partly in section through the cross rail end fitting of FIG. 2, and illustrates the cross sectional C-shaped configuration of the side rail together with the insert to define the closed tubular side rail shape, and clamping device for securing the cross rail end fitting to said side rail.

FIG. 4 is a sectional view taken generally on the line 4—4 of FIG. 3.

DETAILED DESCRIPTION

Turning now to the drawing in greater detail, FIG. 1 shows a luggage rack having a pair of parallel laterally spaced side rails 10, 10 which side rails extend longitudinally of the vehicle and are supported at their opposite ends above a vehicle roof 12 by stanchions 14, 14 and 16, 16. A pair of longitudinally spaced cross bars or rails 18, 18 extend laterally across and between the side rails 10, 10 being supported adjacent their respective ends by cross rail end fittings 20, 20 to be described in greater detail hereinbelow.

The stanchions 14, 14 and 16, 16 are secured to the vehicle roof by screws and each of these stanchions has an open socket end for receiving one end of a side rail 10. That is, each stanchion has a socket adjacent its upper end portion so shaped in cross sectional configuration as to conform to the outer cross sectional configuration of the side rail 10. This shape is best illustrated in FIG. 3 at 10, such shape being of generally rectangular configuration, and more particularly of trapezoidal configuration, but being of closed tubular construction so as to seal the interior of the tubular side rail 10 from the environment, and to increase its strength beyond that possible with the C-shaped side rails of the prior art, and as described above with reference to the Bott patents mentioned previously. The side rails are conventionally retained in the sockets by means of a screw (not shown) provided in the underside of each stanchion and extending through an opening in the stanchion into the socket opening of the stanchion and threadably received in the under side 10a of the side rail 10, which is generally flat.

Turning now to a more detailed description of the cross rail end fittings illustrated in FIGS. 2, 3 and 4, the four such fittings 20, 20 illustrated in FIG. 1 are identical to one another, and each of these end fittings includes a projecting portion 20a having a somewhat narrower portion 20b received in the associated end of a cross rail 18 and conventionally pinned or otherwise secured thereto. Each such cross rail end fitting further includes a portion encircling the side rail 10 and slidable along the side rail 10 as a result of being loosely received thereon. The lower side or wall of the cross bar end fitting, illustrated generally at 20d in FIG. 3, defines an opening for receiving a threaded post 24, and this post has a grooved or slotted area intermediate its ends for receiving a U-shaped spring retainer clip 26. Thus, the threaded post 24 is rotatable in the opening provided for this purpose in the lower side of the cross rail end fitting, and a manually manipulatable knob 22 is secured to the lower end or head of the screw or post, for rotating the post in its associated opening. The upper end 24b of the post 24 is threaded to receive a nut 28 such that rotation of the threaded post 24 in one direction (counterclockwise with right hand thread) will cause the upper face of the nut 28 to engage the underside of the side rail 10 and more particularly of the lower flat segment 10a of the side rail to clamp the cross rail end fitting at a desired location along the side rail 10. Actually, rotation of the post 24 in the opposite direction will merely serve to run the nut 28 downwardly with respect to the threaded end portion of the post 24 until the lower face of the nut 28 engages the upper surface of the snap ring 26.

To facilitate use of the luggage rack, a strap eyelet 20e is formed in the upper portion of the cross rail end fitting, and as so constructed and arranged will be seen to move with the adjustable cross rail 18 to provide a conveniently located attachment point for securing luggage to the rack for transport on the vehicle.

As mentioned previously the side rail 10 is C-shaped, with an elongated insert 30 permanently secured in the open side of the C to provide a tubular side rail having several advantages over the inwardly open extruded C-shaped side rails of the prior art. The tubular shape is stronger in bending and in torsion. It provides a more pleasing appearance to the eye, and it does not provide a resting place for grime and dirt. Finally, the two piece tubular side rail 10 and 30 can be economically extruded from aluminum at a cost much less than extruding this composite tubular shape in a conventional extrusion die, and the cross sectional contour of the channel portion 10 can be formed with a recess on the outer side to receive a wood grain decal, and the upper and lower sides can be formed with shallow ribs to provide a pleasing appearance less susceptible to obvious marring of the relatively soft aluminum side rails by the harder die cast metal from which the end fittings 20 and the threaded nut 28 are made.

I claim:

1. A luggage rack for a vehicle roof or the like comprising a pair of spaced parallel side rails of generally tubular cross section, stanchion means supporting said side rails above the vehicle roof, at least one cross bar extending between said side rails, cross bar end fittings with portions encircling said tubular side rails and each end fitting having a projecting portion fixedly secured to the associated end of a cross bar, a side rail clamping device rotatably mounted in the lower side of each cross bar end fitting portion encircling said side rail, each of said devices including a threaded portion and a member threadably received thereon for acting against the underside of said side rail in response to rotation of said clamping device.

2. The luggage rack of claim 1 wherein said side rail clamping device comprises a threaded post having a head for manual rotation of said device and having an intermediate portion rotatable in the lower side of said cross bar end fitting.

3. The luggage rack of claim 2 wherein said threaded portion of said post is opposite said manually rotatable head, and said member threadably received thereon comprises a nut.

4. The luggage rack of claim 3 wherein said cross rail end fitting portion encircling said side rail has an upper side which defines a luggage strap receiving eye to facilitate securing luggage to the rack.

5. The luggage rack of claim 3 wherein said intermediate portion of said threaded post between said head and said threaded end portion includes an annular slot, a snap ring received in said slot to restrict said post from axial movement in the opening provided in said lower side of said cross rail end fitting portion which encircles said side rail.

6. The luggage rack of claim 1 wherein said tubular side rail has its underside shaped to abut said member threadably received on said threaded portion of said clamping device.

7. The luggage rack of claim 6 wherein the underside of each of said tubular side rails defines a generally flat segment, and wherein said members comprise threaded nuts threadably received on threaded portions of said clamping devices, said nuts having faces for abutting said flat segments of said side rails.

8. The luggage rack of claim 1 wherein said tubular side rails are generally C-shaped in cross section with the underside of the C defining a generally flat side, and said members threadably received in said clamping devices comprising threaded nuts with flat faces for engaging said flat sides of the C-shaped cross rails, and an elongated insert slidably received in the open side of each C-shaped cross rail to provide a closed tubular cross sectional shape.

9. The luggage rack of claim 8 wherein said side rails encircling portion of each of said cross bar end fittings has a lower side defining an opening to rotatably receive said clamping device, and a recess in the side wall of said lower side to non-rotatably receive said threaded nut, and a snap ring for retaining said clamping device in said lower side opening, said device comprising a threaded post having a head and a portion intermediate said head and said threaded portion which intermediate portion is slotted to receive said snap ring retainer.

10. The luggage rack of claim 1 wherein said tubular side rails are of non-circular cross section, and wherein said tubular side rails define elongated flats on their undersides, said clamping devices comprising threaded posts, each post having a head portion, and each post having a threaded end portion for said threaded member, and each post having a portion intermediate the head and threaded end portion, said intermediate portion defining an annular slot, and a snap ring in said slot to restrain said threaded post from downward movement axially in an opening provided for rotatably receiving said post, said post head portion restraining said post from upward axial movement, and said threaded member comprising a nut with its upper face adapted to engage the elongated flat in said non-circular tubular side rail.

* * * * *